United States Patent Office  3,036,111
Patented May 22, 1962

3,036,111
ACETYLENIC BORON COMPOUNDS AND
METHOD FOR MAKING THE SAME
George W. Willcockson, Anaheim, Calif., assignor to
United States Borax & Chemical Corporation, Los Angeles, Calif., a corporation of Nevada
No Drawing. Filed Apr. 23, 1959, Ser. No. 808,324
10 Claims. (Cl. 260—462)

This invention relates as indicated to organoboron compounds and has more particular reference to acetylenic boron compounds and preparation of the same.

It is an object of the present invention to provide as new compounds metal ethynyltrialkoxyborates and a method for preparing the same.

It is a further object of this invention to provide as new compounds dialkyl ethynylboronates and a method for preparing the same.

A still further object is to provide novel acetylenic boron compounds which readily undergo polymerization or copolymerization to yield high molecular weight boron containing polymers.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises ethynylboron compounds having the general formula $$HC \equiv C-Y$$

wherein Y is a material selected from the group consisting of $B(OR)_3M$ and $B(OR)_2$, R is an alkyl radical and M is a material selected from the group consisting of Na, Li, K, MgCl and MgBr.

It is important to note that the present acetylenic boron materials are ethynylboron compounds wherein the beta carbon atom of the ethynyl group is always unsubstituted and a boron atom is always directly bonded to the alpha carbon atom of the ethynyl group.

The present ethynylboron compounds have many applications in organic syntheses and polymer formation. These compounds will also be found to have utility as fungicides and defoliants. The present compounds are also a ready source of acetylene which can be easily handled. For example, when dialkyl ethynylboronate is put into water it instantaneously releases acetylene gas.

I have found that the metal ethynyltrialkoxyborates of the present invention can be produced in substantially quantitative yields by reaction of a metal acetylide with a borate ester. The acetylide used in the present process can be sodium acetylide, lithium acetylide, potassium acetylide, ethynylmagnesium chloride or ethynylmagnesium bromide. It will be noted in every instance that the present process uses an ethynyl compound wherein the metal is directly bonded to the alpha carbon atom and the beta carbon atom is unsubstituted. In the preferred embodiment of my invention I use sodium acetylide since it is the cheapest and most readily available of the aforegoing acetylides. However, it must be emphasized that the other enumerated acetylides are equally applicable to the present process. As for the borate ester used in the present process, it can be derived from any alcohol, the number of carbon atoms in the alkyl group of the ester being immaterial to the present invention. However, in the preferred embodiment of my invention I use borate esters having an alkyl group of one to four carbon atoms. Here again this is dictated by economy and availability, and again it must be emphasized that the size of the alkyl group is immaterial to the present process. Thus, methyl borate to dodecyl borate, or esters having even larger alkyl groups, can be use in the present process.

The reaction to produce the present metal ethynyltrialkoxyborates can be illustrated by the following general equation:

$$HC \equiv CM + B(OR)_3 \rightarrow HC \equiv CB(OR)_3M$$

where M is Na, Li, K, MgCl or MgBr, and R is an alkyl group.

Referring now to the dialkyl ethynylboronates of the present invention, these compounds are readily produced from the aforegoing metal ethynyltrialkoxyborates by reacting the same with any anhydrous material having an active halogen in a non-hydroxylic solvent. By reacting the metal ethynyltrialkoxyborate with a material such as benzoyl chloride or boron trichloride in any non-hydroxylic solvent the dialkyl ethynylboronates can be produced in excellent yields. It must be emphasized that this reaction must be conducted in media completely free of hydroxyl radicals. Hydrocarbon and ethereal solvents such as diglyme, or xylene, are applicable to this reaction. The following general equation is illustrative of this reaction:

$$HC \equiv CB(OR)_3Na + \phi COCl \rightarrow HC \equiv CB(OR)_2 + NaCl + \phi CO_2R$$

So that the present invention can be more clearly understood, the following illustrative examples are given:

I

*Preparation of Sodium Ethynyltrimethoxyborate*

Ammonia-free sodium acetylide (12.6 grams, 0.26 mole) prepared according to the method of Campbell and Campbell [Org. Syn., vol. 30, 15 (1950)], was added to 32.2 grams (0.31 mole) of trimethyl borate in 250 ml. of diglyme at −70° C. The resulting mixture was allowed to warm to room temperature in one hour and was then filtered under dry nitrogen. The filter cake was washed with four 50-ml. portions of 30–60° petroleum ether and dried for about 17 hours at room temperature and 40 mm. The resultant crystalline material was then further heated at 110° C. for about 16 hours at 0.3 mm.

The product hydrolyzed rapidly in water with evolution of acetylene. The analysis of the product corresponded with the theoretical analysis for $C_5H_{10}O_3NaB$.

II

*Preparation of Sodium Ethynyltriisopropoxyborate*

Sodium acetylide (13.5 grams, 0.281 mole), prepared as above, was added to 63.1 grams (0.335 mole) of triisopropylborate in 250 ml. of diglyme at −70° C. While stirring, the mixture was allowed to warm to room temperature in one hour. The reaction mass was filtered under dry nitrogen and washed with 350 ml. of 30–60° petroleum ether. The material was dried at room temperature for about 18 hours at 37 mm.

The crystalline product rapidly hydrolyzed in water with evolution of acetylene. The chemical analysis corresponded to the theoretical analysis for $C_{11}H_{22}O_3NaB$.

III

*Preparation of Dimethyl Ethynylboronate*

Sodium acetylide was prepared from 23.0 grams (1.0 gram-atom) of sodium and acetylene in 1.4 liters of dry xylene according to the procedure described by Rutledge [J. Org. Chem., vol. 22, 649 (1957)]. The product was of extremely small particle size which remained suspended in the xylene without settling.

Freshly distilled trimethyl borate, 1.15 moles, was added rapidly to the sodium acetylide suspension at room temperature with rapid stirring. The mixture was then heated to 90–105° C., with stirring, for about 45 minutes. After slowly cooling to room temperature, the reaction mass was cooled to 5° C. in an ice bath. While maintaining the temperature at about 5–10° C., liquid boron trichloride (0.34 mole) was added from an ice water cooled buret over a 30 minute period. Stirring was continued for 15 minutes at 5–10° and for about 1.5 hours at 10–25° C.

The reaction mass was then filtered under dry nitrogen.

Distillation of the filtrate under nitrogen yielded dimethyl ethynylboronate, B.P. 59–62° C./262 mm. The product possessed a characteristic pungent odor and the infrared spectrum exhibited the characteristic acetylenic carbon-hydrogen and triple bond stretching frequencies at 3.1 and 4.8 mm., respectively. The chemical analysis corresponded to the theoretical analysis for $C_4H_7O_2B$.

A sample of the dimethyl ethynylboronate was introduced into a Pyrex tube under nitrogen and frozen in Dry Ice. The tube was then evacuated and sealed. The tube was then suspended in refluxing water vapor at 100° C. for about 22–23 hours. At the end of this period, the material in the tube was a dark brown polymeric material.

Other modes of applying the principle of the invention may be employed, change being made as regards the details described, provided the features stated in any of the following claims or the equivalent of such be employed.

I, therefore, particularly point out and distinctly claim as my invention:

1. Ethynylboron compounds having the general formula $$HC \equiv C-Y$$

wherein Y is a material selected from the group consisting of $B(OR)_3M$ and $B(OR)_2$, R is an alkyl radical and M is a material selected from the group consisting of Na, Li, K, MgCl and MgBr.

2. Ethynylboron compounds having the general formula $$HC \equiv CB(OR)_3M$$

wherein M is a material selected from the group consisting of Na, Li, K, MgCl and MgBr and R is an alkyl group.

3. Ethynylboron compounds having the general formula $$HC \equiv CB(OR)_2$$

wherein R is an alkyl group.

4. Sodium ethynyltrimethoxyborate.
5. Sodium ethynyltriisopropoxyborate.
6. Dimethyl ethynylboronate.
7. Diisopropyl ethynylboronate.
8. The method of producing ethynylboron compounds having the general formula $$HC \equiv CB(OR)_2$$

wherein R is an alkyl group, which comprises reacting an ethynyl compound having the general formula $HC \equiv CM$ wherein M is a material selected from the group consisting of Na, Li, K, MgCl and MgBr with an alkyl borate ester and a material selected from the group consisting of anhydrous boron halides and acyl halides in a non-hydroxylic inert solvent and distilling the resultant dialkyl ethynylboronate from the reaction mass.

9. The method of producing dimethyl ethynylboronate which comprises reacting sodium acetylide, trimethyl borate and a material selected from the group consisting of anhydrous benzoyl chloride and anhydrous boron trichloride in a non-hydroxylic inert solvent and distilling the resultant dimethyl ethynylboronate from the reaction mass.

10. The method of producing diisopropyl ethynylboronate which comprises reacting sodium acetylide, triisopropyl borate and a material selected from the group consisting of anhydrous benzoyl chloride and anhydrous boron trichloride in a non-hydroxylic inert solvent and distilling the resultant diisopropyl ethynylboronate from the reaction mass.

No references cited.